(12) United States Patent
Hsieh

(10) Patent No.: US 7,665,878 B2
(45) Date of Patent: Feb. 23, 2010

(54) BACKLIGHT MODULE WITH SHOCK-PROTECTION ELASTIC MEMBER AND LIQUID CRYSTAL DISPLAY USING SAME

(75) Inventor: Yu-Chih Hsieh, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 191 days.

(21) Appl. No.: 11/825,861

(22) Filed: Jul. 9, 2007

(65) Prior Publication Data

US 2008/0007971 A1    Jan. 10, 2008

(30) Foreign Application Priority Data

Jul. 7, 2006    (TW) ............................. 95124915 A

(51) Int. Cl.
*F21V 17/00* (2006.01)

(52) U.S. Cl. ..................... 362/633; 362/632; 362/634; 362/369

(58) Field of Classification Search ......... 362/632–634, 362/369
See application file for complete search history.

(56) References Cited

U.S. PATENT DOCUMENTS

| 6,392,724 | B2 | 5/2002 | An et al. | |
|---|---|---|---|---|
| 7,004,614 | B2 * | 2/2006 | Tsai et al. | ................... 362/633 |
| 7,226,201 | B1 * | 6/2007 | Li et al. | ...................... 362/633 |
| 2004/0080952 | A1 * | 4/2004 | Chu et al. | ................... 362/374 |

FOREIGN PATENT DOCUMENTS

JP        2003279938 A    10/2003

* cited by examiner

*Primary Examiner*—Anabel M Ton
(74) *Attorney, Agent, or Firm*—Wei Te Chung

(57) ABSTRACT

A backlight module (200) typically used in a liquid crystal display (LCD) (20) includes at least one light emitting unit (250), and a frame (260) receiving the at least one light emitting unit therein. The frame includes a main body (261), and at least one elastic member provided at an outer side surface of the main body. The LCD employing the backlight module can be prevented from being damaged if the LCD falls to the ground or is bumped.

13 Claims, 7 Drawing Sheets

BACKLIGHT MODULE WITH SHOCK-PROTECTION ELASTIC MEMBER AND LIQUID CRYSTAL DISPLAY USING SAME

FIELD OF THE INVENTION

The present invention relates to backlight modules such as those used in liquid crystal displays (LCDs); and more particularly to a backlight module with an elastic member provided at an outer side thereof, and an LCD using the backlight module.

GENERAL BACKGROUND

Liquid crystal of an LCD does no itself emit light. Therefore it is common for a backlight module to be installed in an LCD device together with the LCD. The backlight module provides a uniform flat light source to enable the LCD to display images.

Referring to FIG. 8, this is an exploded, isometric view of a typical liquid crystal display. The liquid crystal display 10 includes a liquid crystal panel 190, and a backlight module 100 adjacent to an underside of the liquid crystal panel 190.

The backlight module 100 includes a first brightness enhancement film 110, a second brightness enhancement film 120, a diffusion film 130, a light guide plate (LGP) 140, a plurality of light emitting units 150, a reflector 170, and a frame 160. The first and second brightness enhancement films 110, 120, and the diffusion film 130 are arranged from top to bottom in that order. The frame 160 receives the three films 110, 120, 130, the LGP 140, the light emitting units 150, and the reflector 170. The frame 160 may be made of metal, plastic, or another suitable material. The light emitting units 150 are typically light emitting diodes (LEDs).

The LGP 140 includes a light incident surface 141, a light emission surface 142 substantially perpendicular to the light incident surface 141, and a bottom surface 143 opposite to the light emission surface 142. The light emitting units 150 are arranged adjacent to the light incident surface 141 of the LGP 140. The reflector 170 is located adjacent to the bottom surface 143 of the LGP 140. The diffusion film 130 is disposed adjacent to the light emission surface 142 of the LGP 140.

The liquid crystal display 10 is assembled by the following steps: firstly, the LGP 140 and the reflector 170 are received in the frame 160; subsequently, the light emitting units 150 are arranged in the frame 160 adjacent to the light incident surface 141 of the LGP 140; finally, the diffusion film 130, the second and first brightness enhancement films 120, 110, and the liquid crystal panel 190 are disposed in that order from bottom to top on the light emission surface 142 of the LGP 140.

The frame 160 is made of metal, plastic or another suitable material, and includes four enlarged corner portions for added strength (see FIG. 9). However, the liquid crystal display 10 may sustain great shock when it falls to the ground or is bumped. As a result, components of the liquid crystal display 10 are liable to be damaged. In particular, the liquid crystal panel 190 and the LGP 140 are liable to sustain damage.

What is needed, therefore, is a backlight module and a liquid crystal display employing the backlight module that can overcome the above-described deficiencies.

SUMMARY

A backlight module for a liquid crystal display includes at least one light emitting unit, and a frame receiving the at least one light emitting unit therein. The frame includes a main body, and at least one elastic member provided at an outer side surface of the main body.

A liquid crystal display includes a liquid crystal panel, and a backlight module adjacent to the liquid crystal panel. The backlight module includes a frame, which includes a main body and at least one elastic member. The at least one elastic member is provided at an outer side surface of the main body.

Other advantages and novel features will become more apparent from the following detailed description when taken in conjunction with the accompanying drawings. In the drawings, are the views are schematic.

DETAILED DESCRIPTION OF PREFERRED EMBODIMENTS

Reference will now be made to the drawings to describe the preferred embodiments in detail.

Figure 1:
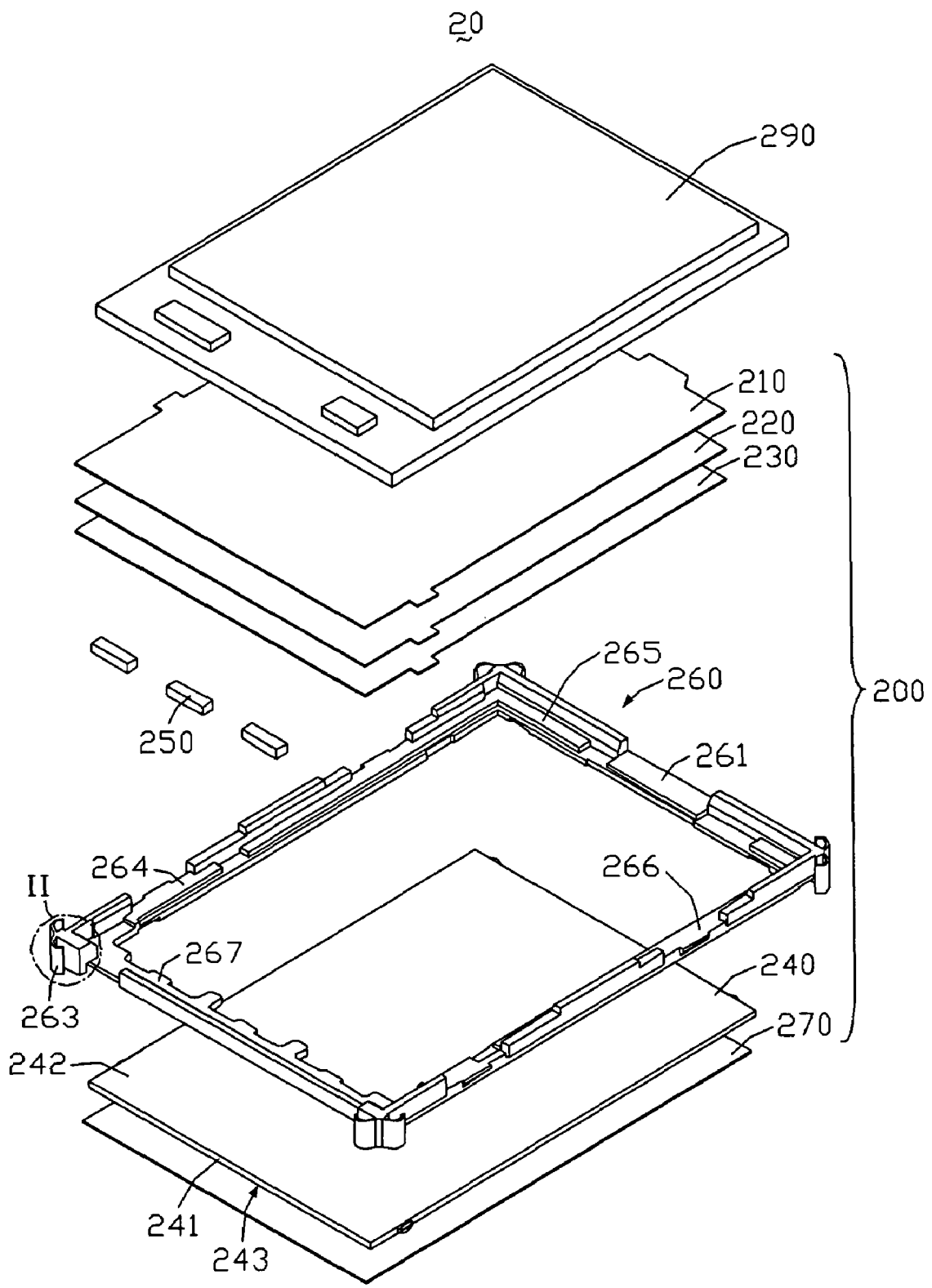
FIG. 1 is an exploded, isometric view of an LCD according to a first embodiment of the present invention.

FIG. 1 is an exploded, isometric view of a backlight module of an LCD according to a first embodiment of the present invention. The LCD 20 mainly includes a liquid crystal panel 290 for displaying images, and a backlight module 200 adjacent to an underside of the liquid crystal panel 290 for illuminating the liquid crystal panel 290.

The backlight module 200 includes a first brightness enhancement film 210, a second brightness enhancement film 220, a diffusion film 230, an LGP 240, a plurality of light emitting units 250, a reflector 270, and a frame 260. The first and second brightness enhancement films 210, 220, and the diffusion film 230 are arranged from top to bottom in that order. The frame 260 receives the three films 210, 220, 230, the LGP 240, the light emitting units 250, and the reflector 270. The light emitting units 250 may be light emitting diodes (LEDs), and the frame 260 may be made of plastic, metal or another suitable material.

The LGP 240 includes a light incident surface 241, a light emission surface 242 substantially perpendicular to the light incident surface 241, and a bottom surface 243 opposite to the light emission surface 242. The light emitting units 250 are arranged adjacent to the light incident surface 241 of the LGP 240. The reflector 270 is located adjacent to the bottom surface 243 of the LGP 240. The diffusion film 230 is disposed adjacent to the light emission surface 242 of the LGP 240.

The frame 260 includes a main body 261, and four elastic members 263 integrally formed with the main body 261. The main body 261 includes a first side wall 264, a second side wall 265, a third side wall 266 opposite to the first side wall 264, and a fourth side wall 267 opposite to the second side wall 265. The first, second, third, and fourth side walls 264, 265, 266, 267 are arranged end-to-end and cooperatively define a four-sided closed space (not labeled) therebetween. Four corners (not labeled) of the main body 261 are defined at four junctions where each two respective adjacent of the first, second, third, and fourth side walls 264, 265, 266, 267 meet each other. The four elastic members 263 extend out from the four corners of the main body 261, respectively.

Figure 2:
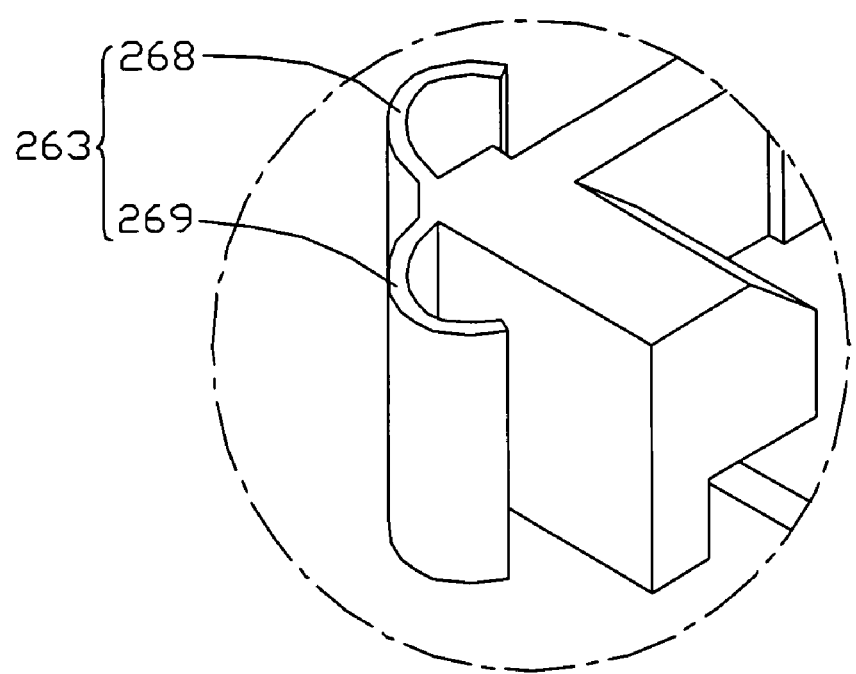
FIG. 2 is an enlarged view of a circled portion II of FIG. 1, showing an elastic member and part of a frame of the LCD.
Figure 3:
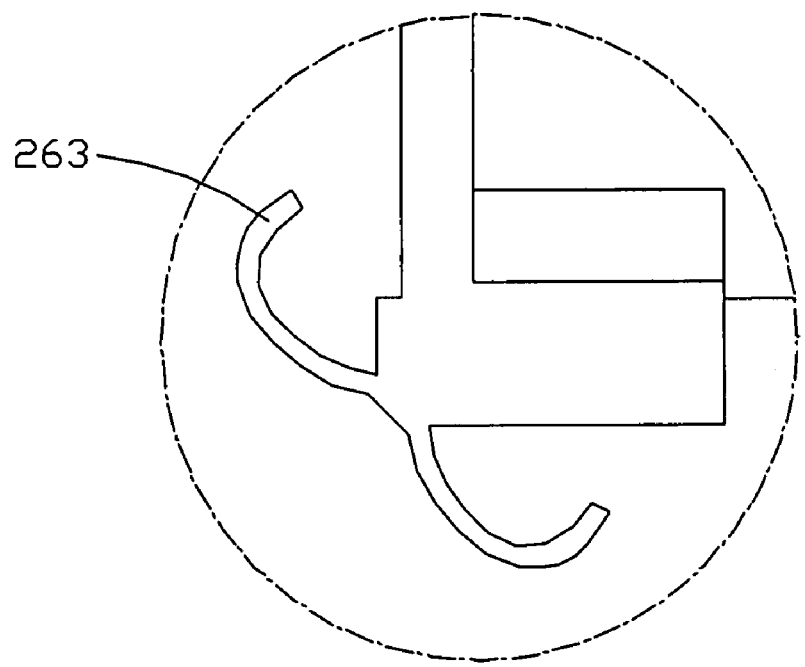
FIG. 3 is similar to FIG. 2, but showing a top plan view of the elastic member and the part of the frame.

Referring also to FIGS. 2 and 3, each of the elastic members 263 includes two curved lugs 268, 269 that are oriented symmetrically opposite each other. Base portions of the lugs 268, 269 are close to each other at an outer corner portion of the corner. Each lug 268, 269 progressively bends from the base portion toward the corresponding nearest first, second, third, or fourth side wall 264, 265, 266, 267. In one embodiment, each lug 268, 269 can be substantially in the shape of an arc.

The liquid crystal display 20 is assembled by the following steps: firstly, the LGP 240 and the reflector 270 are received in the frame 260, with the four elastic members 263 extending out of the main body 261; subsequently, the light emitting units 250 are arranged in the frame 260 adjacent to the light incident surface 241 of the LGP 240; finally, the diffusion film 230, the second and first brightness enhancement films 220, 210, and the liquid crystal panel 290 are disposed in that order from bottom to top on the light emission surface 242 of the LGP 240.

In operation, light beams emitted by the light emitting units 250 enter the LGP 240 via the light incident surface 241. Most of the light beams transmit to the light emission surface 242 of the LGP 240 without involvement of the reflector 270. Some of the light beams transmit through the bottom surface 243 of the LGP 240 to the reflector 270, are reflected back into the LGP 240 through the bottom surface 243, and transmit to the light emission surface 242. All the light beams transmit through the light emission surface 242 of the LGP 240, transmit through the diffusion film 230, the second and first brightness enhancement films 220, 210 in turn, and finally illuminate the liquid crystal display panel 290.

If the liquid crystal display 20 falls to the ground or is bumped, the four elastic members 263 arranged on the main body 261 and extending out therefrom can absorb much of the shock. Therefore, components of the liquid crystal display 20 are protected from being damaged. In particular, the liquid crystal panel 290 and the LGP 240 are protected from being damaged.

Figure 4:
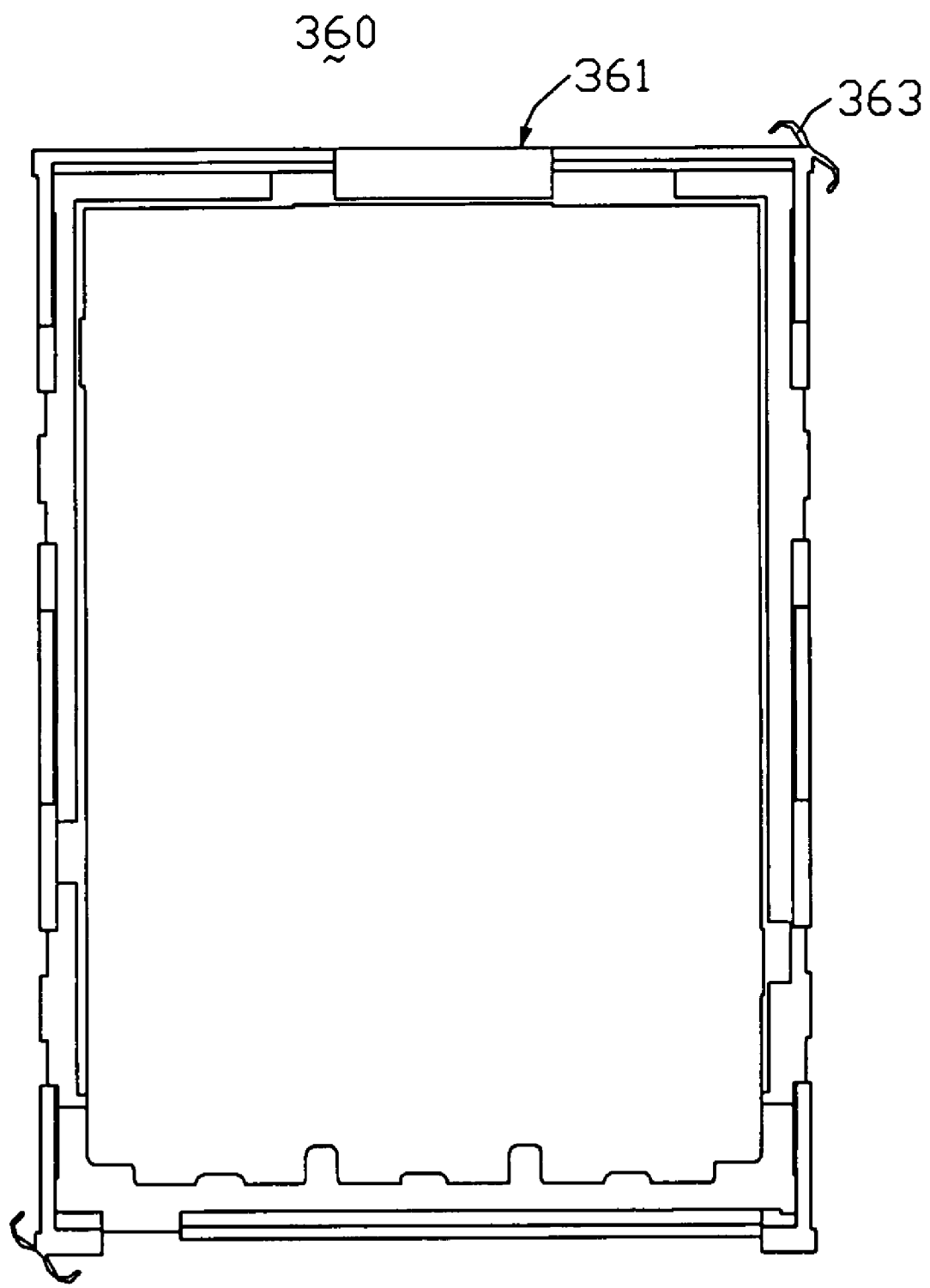
FIG. 4 is a top plan view of a frame of a backlight module according to a second embodiment of the present invention.

FIG. 4 is a top plan view of a frame of a backlight module according to a second embodiment of the present invention. The backlight module (not labeled) has a structure similar to that of the backlight module 200. However, the frame 360 includes a main body 361, and two elastic members 363 arranged at two diagonal corners (not labeled) of the main body 361. The elastic members 363 have a configuration similar to the elastic members 263.

Figure 5:
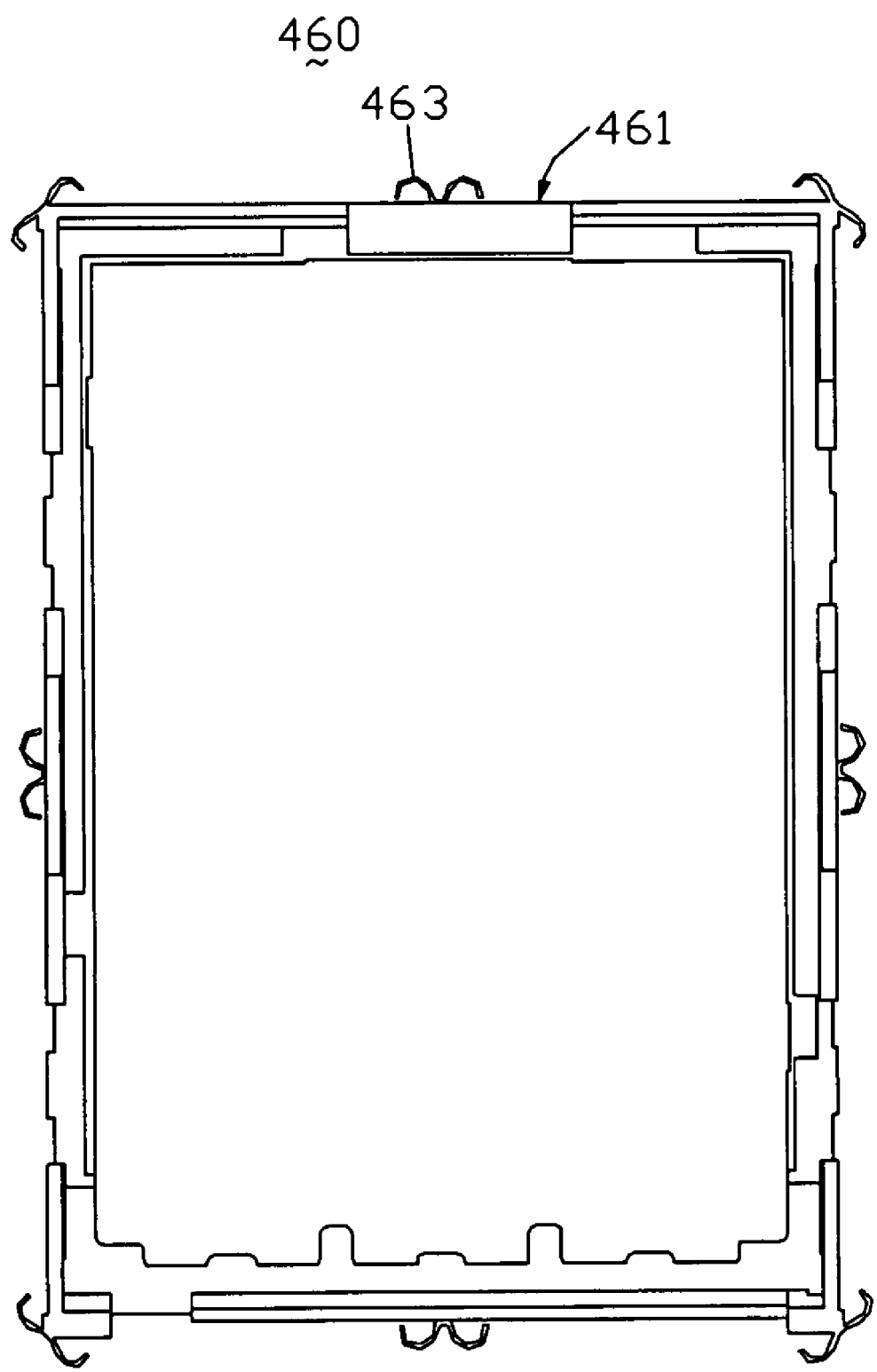
FIG. 5 is a top plan view of a frame of a backlight module according to a third embodiment of the present invention.

FIG. 5 is a top plan view of a frame of a backlight module according to a third embodiment of the present invention. The backlight module (not labeled) has a structure similar to that of the backlight module 200. However, the frame 460 includes a main body 461, four elastic members 463 arranged at four corners (not labeled) of the main body 461 respectively, and another four elastic members 463 arranged on outer sides of four side walls (not labeled) of the main body 461 respectively. The elastic members 463 have a configuration similar to the elastic members 263.

Figure 6:
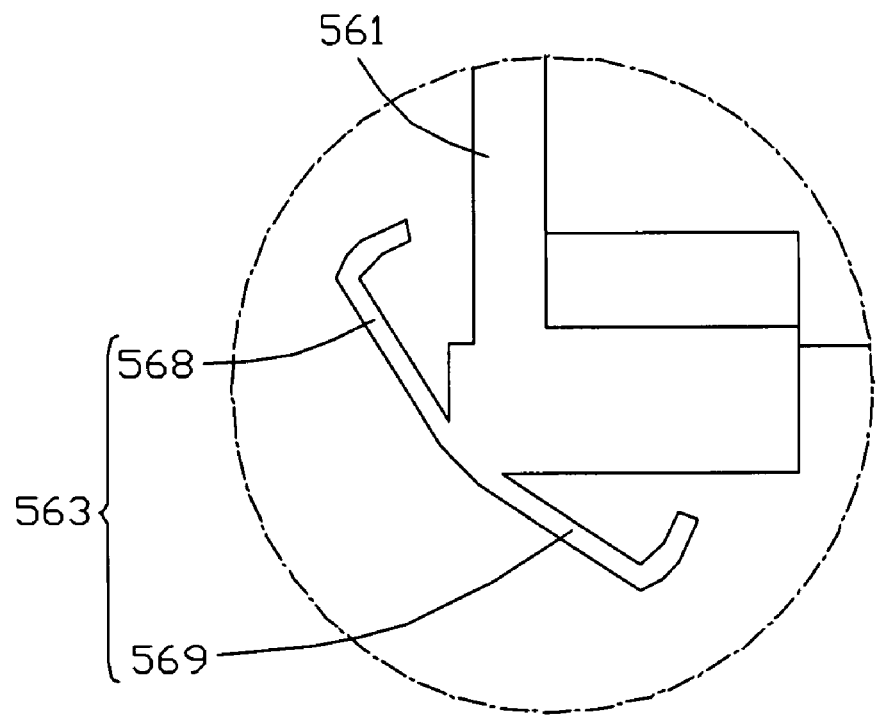
FIG. 6 is an enlarged, top plan view of an elastic member and part of a frame of a backlight module according to a fourth embodiment of the present invention.

FIG. 6 is a top plan view of an elastic member and part of a frame of a backlight module according to a fourth embodiment of the present invention. The backlight module (not labeled) has a structure similar to that of the backlight module 200. However, each elastic member 563 includes two hook-shaped lugs 568, 569 that are oriented symmetrically opposite each other. Base portions of the lugs 568, 569 are close to each other at an outer corner portion of a respective corner (not labeled) of a main body 561 of the frame (not labeled). Each lug 568, 569 has a curved hook portion at a distal end thereof. The hook portion progressively bends more directly toward a corresponding side wall (not labeled) of the frame. In one embodiment, each lug 568, 569 can be substantially in the shape of an arc.

Figure 7:
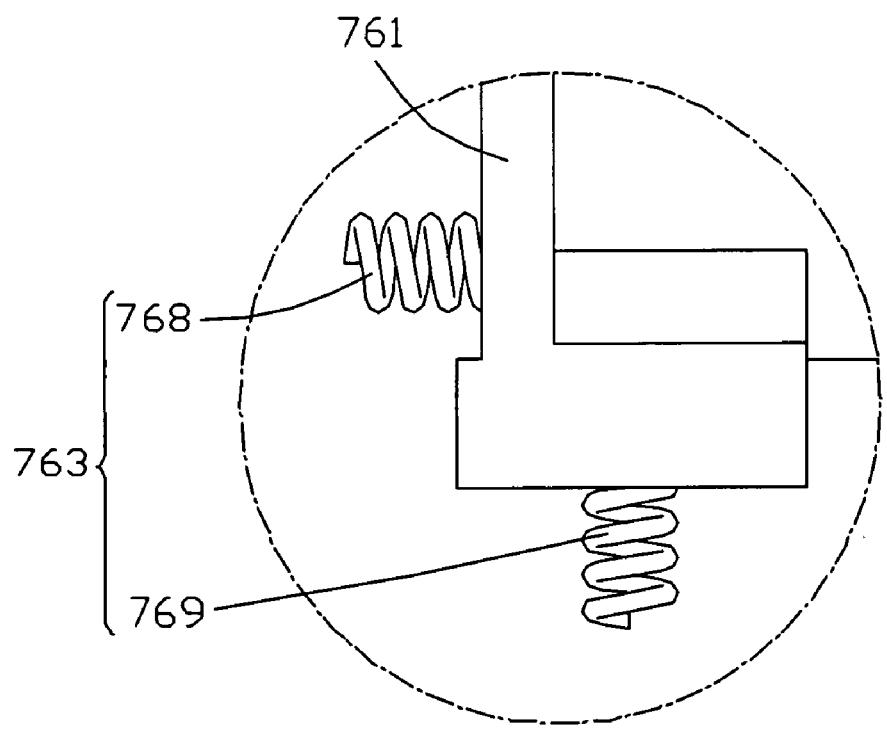
FIG. 7 is an enlarged, top plan view of an elastic member and part of a frame of a backlight module according to a fifth embodiment of the present invention.
Figure 8:
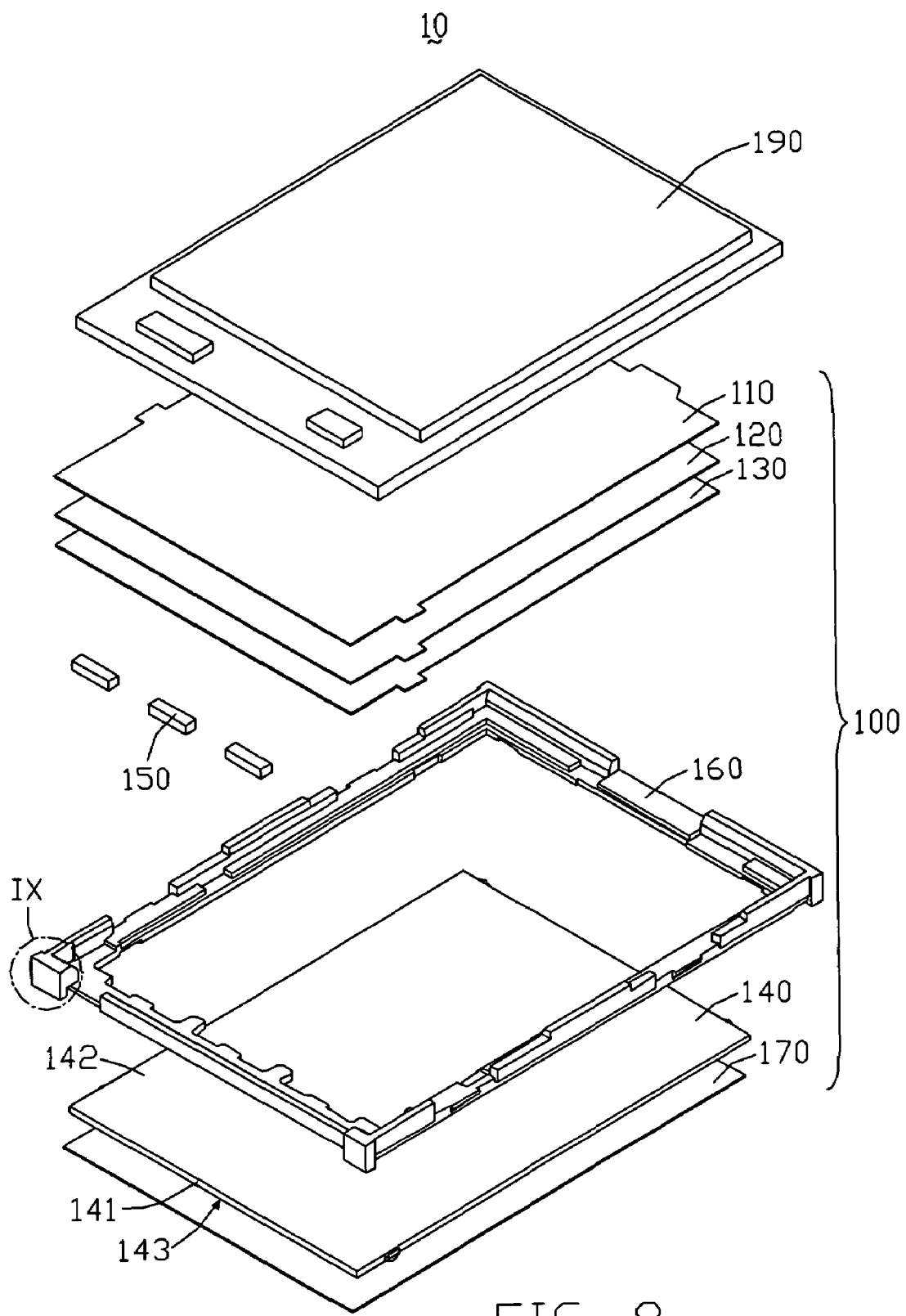
FIG. 8 is an exploded, isometric view of a conventional liquid crystal display.
Figure 9:
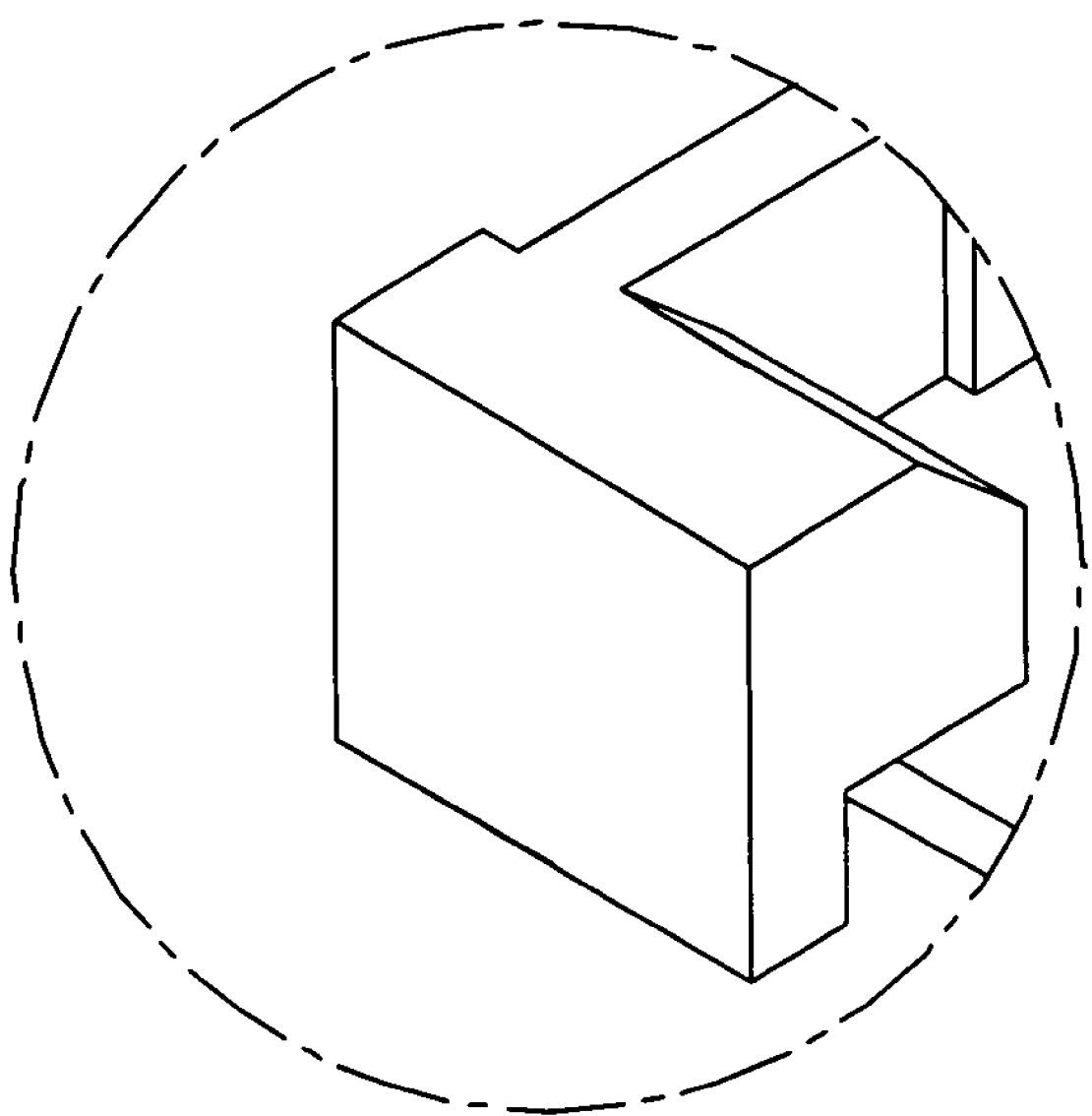
FIG. 9 is an enlarged view of a circled portion IX of FIG. 8.

FIG. 7 is a top plan view of an elastic member and part of a frame of a backlight module according to a fifth embodiment of the present invention. The backlight module (not labeled) has a structure similar to that of the backlight module 200. However, each elastic member 763 includes two coil springs 768, 769 arranged at a corner (not labeled) of a main body 761 of the frame (not labeled). The coil springs 768, 769 extend or protrude directly out from adjacent sides of the corner respectively, and are oriented perpendicular to each other. The coil springs 768, 769 can be made of metal or plastic. In one example, the coil springs 768, 769 are interferingly fixed in the corner. In another example, the coil springs 768, 769 are adhered to the corner. In a further example, the coil springs 768, 769 are both interferingly fixed in and adhered to the corner.

Various modifications and alterations are possible within the ambit of the invention herein. For example, each of the elastic members may be in the form of a separate body. In such case, each elastic member can be fixed to the main body of the frame by suitable means such as adhesion or interferential engagement.

It is to be further understood that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A backlight module, comprising:
at least one light emitting unit; and
a frame receiving the at least one light emitting unit therein, the frame comprising:
a main body, the main body comprising a first side wall, a second side wall, a third side wall, and a fourth side wall, and the first, second, third, and fourth side walls being arranged end-to-end and thereby cooperatively defining a four-sided closed space therebetween, the main body defining four corners at four junctions where each two respective adjacent the first, second, third, and fourth side walls meet each other; and
at least one elastic member provided at an outer side of the main body, the at least one elastic member being arranged at one of the corners of the main body of the frame.

2. The backlight module as claimed in claim 1, wherein each of the at least one elastic member comprises two symmetrically opposite lugs, and each lug comprises a portion that progressively bends toward a corresponding nearest one of the first, second, third, and fourth side walls.

3. The backlight module as claimed in claim 2, wherein the lugs are arc-shaped lugs.

4. The backlight module as claimed in claim 2, wherein each of the lugs has a hook-shaped portion at a free end thereof, and it is the hook-shaped portion that progressively bends toward the corresponding nearest one of the first, second, third, and fourth side walls.

5. The backlight module as claimed in claim 1, wherein each elastic member comprises two springs.

6. The backlight module as claimed in claim 1, wherein the at least one elastic member is a separate body attached to the main body.

7. The backlight module as claimed in claim 1, wherein the at least one elastic member is made of metal or plastic.

8. The backlight module as claimed in claim 1, wherein the at least one elastic member and the main body are integrally formed as a single piece that is the frame.

9. A liquid crystal display, comprising:
a liquid crystal panel; and
a backlight module adjacent to the liquid crystal panel, the backlight module comprising a frame, the frame comprising:
a main body, the main body comprising a first side wall, a second side wall, a third side wall, and a fourth side wall, and the first, second, third, and fourth side walls being arranged end-to-end and thereby cooperatively defining a four-sided closed space therebetween; and
at least one elastic member arranged at an outer side of the main body, each of the at least one elastic member comprising two symmetrically opposite lugs, and each lug comprising a portion that progressively bends toward a corresponding nearest one of the first, second, third, and fourth side walls.

10. The liquid crystal display as claimed in claim 9, wherein the lugs are arc-shaped lugs.

11. The liquid crystal display as claimed in claim 9, wherein each of the lugs has a hook-shaped portion at a free end thereof, and it is the hook-shaped portion that progressively bends toward the corresponding nearest one of the first, second, third, and fourth side walls.

12. The backlight module as claimed in claim 1, wherein there are at least two of said at least one elastic member arranged symmetrical with each other with regard to a center of said main body.

13. The liquid crystal display as claimed in claim 9, wherein there arc at least two of said at least one elastic member providing opposite forces for counterbalancing.

\* \* \* \* \*